United States Patent
Meurer

(10) Patent No.: US 10,579,965 B2
(45) Date of Patent: Mar. 3, 2020

(54) SUPPLY METHOD FOR PALLETIZING DEVICES IN DISTRIBUTION CENTERS

(71) Applicant: Dematic GmbH, Heusenstamm (DE)

(72) Inventor: Hans Christoph Meurer, Roßdorf (DE)

(73) Assignee: Dematic GmbH, Heusenstamm (DE)

( * ) Notice: Subject to any disclaimer, the term of this patent is extended or adjusted under 35 U.S.C. 154(b) by 215 days.

(21) Appl. No.: 15/457,233

(22) Filed: Mar. 13, 2017

(65) Prior Publication Data

US 2017/0185959 A1    Jun. 29, 2017

Related U.S. Application Data

(63) Continuation of application No. PCT/EP2015/070956, filed on Sep. 14, 2015.

(30) Foreign Application Priority Data

Sep. 15, 2014 (DE) .................. 10 2014 113 271

(51) Int. Cl.
*G06Q 10/08* (2012.01)
*B65G 1/137* (2006.01)

(52) U.S. Cl.
CPC ....... *G06Q 10/0875* (2013.01); *B65G 1/1373* (2013.01); *B65G 1/1378* (2013.01)

(58) Field of Classification Search
CPC ................................................. H01L 21/67736
See application file for complete search history.

(56) References Cited

U.S. PATENT DOCUMENTS

| 9,452,886 | B2 * | 9/2016 | Yamashita | ........... B65G 1/1378 |
| 2004/0088229 | A1 * | 5/2004 | Xu | ........... B65G 1/137 705/28 |
| 2006/0031127 | A1 * | 2/2006 | Vercammen | ......... B65G 1/1373 705/26.1 |

(Continued)

FOREIGN PATENT DOCUMENTS

| AT | 503473 A1 | 10/2007 |
| CA | CA261394 A1 | 11/2007 |

(Continued)

OTHER PUBLICATIONS

Bartholdi, J. J., & Hackman, S. T. (May 24, 2002). Warehouse & Distribution Science Release 0.1.2. (Year: 2002).*

(Continued)

*Primary Examiner* — Asfand M Sheikh
*Assistant Examiner* — Avia Salman
(74) *Attorney, Agent, or Firm* — Gardner, Linn, Burkhart & Ondersma LLP

(57) ABSTRACT

A method of supplying a palletizing device with goods for order-related palletization in a warehouse, which method may include delivering pallets to the incoming goods area of the warehouse and temporarily storing the pallets. Pallets containing goods required for replenishing of a buffer storage area may be removed from temporary storage and depalletized from the pallets in a depalletizer. The goods can be singulated and buffered in a buffer storage area. The buffer storage area can be connected to the palletizing device, and the goods required for an order can be removed from the temporary storage and transported to the palletizing device individually and in a controlled manner according to a specified sequence. The buffer storage area may be supplied with new goods from the pallets in the temporary storage by removal therefrom, depalletizing and singulation by means of a dynamic adaptation of the quantity removed from storage and depalletized.

20 Claims, 2 Drawing Sheets

(56) References Cited

U.S. PATENT DOCUMENTS

| | | | | |
|---|---|---|---|---|
| 2008/0040246 | A1* | 2/2008 | Fukamachi | B65G 1/1371 |
| | | | | 705/29 |
| 2009/0074545 | A1* | 3/2009 | Lert, Jr. | B65G 1/0492 |
| | | | | 414/276 |
| 2009/0112675 | A1* | 4/2009 | Servais | G06Q 10/06315 |
| | | | | 705/7.25 |
| 2009/0234493 | A1* | 9/2009 | Pandit | G06Q 10/08 |
| | | | | 700/215 |
| 2010/0316470 | A1* | 12/2010 | Lert | B65G 1/0492 |
| | | | | 414/273 |
| 2011/0027053 | A1* | 2/2011 | Freudelsperger | B65G 1/0485 |
| | | | | 414/273 |
| 2011/0217150 | A1* | 9/2011 | Takehara | B65G 67/00 |
| | | | | 414/392 |
| 2012/0141236 | A1* | 6/2012 | Korner | B65G 1/0407 |
| | | | | 414/222.01 |
| 2012/0179632 | A1* | 7/2012 | Pienta | B65G 1/0442 |
| | | | | 705/500 |

FOREIGN PATENT DOCUMENTS

| | | |
|---|---|---|
| DE | 197 19 651 A1 | 6/1998 |
| DE | 102006025620 A1 | 11/2007 |
| DE | 10 2008 035178 A1 | 2/2010 |
| DE | 102013101659 A1 | 8/2013 |
| EP | 1 486 435 A1 | 12/2004 |
| EP | 1462394 B1 | 8/2006 |
| WO | WO 2012156355 A1 | 11/2012 |

OTHER PUBLICATIONS

Viastore Systems Gmbh: "Systeme de flux de materiaux viad@tMFC | viastore", Aug. 2, 2013, XP055205849, retrieved from the Internet: URL: http://www.viastore.fr/systeme-de-gestion-dentrepot-wms/systeme-de-flux-de-materiaux-viadat-mfc/ [retrieved on Aug. 3, 2015].
International Preliminary Report on Patentability, for related case PCT/EP2015/070956, dated Mar. 21, 2017.

\* cited by examiner

SUPPLY METHOD FOR PALLETIZING DEVICES IN DISTRIBUTION CENTERS

CROSS-REFERENCE TO RELATED APPLICATIONS

This application is a continuation of International Patent Application No. PCT/EP2015/070956 filed on Sep. 14, 2015, which claims priority to German Patent Application No. 10 2014 113 271.8 filed on Sep. 15, 2014.

INCORPORATION BY REFERENCE

The disclosures of International Patent Application No. PCT/EP2015/070956 filed on Sep. 14, 2015, and German Patent Application No. 10 2014 113 271.8 filed on Sep. 15, 2014, are hereby incorporated by reference herein as if set forth in their entireties.

TECHNICAL FIELD

This disclosure relates to, in one aspect, a supply method for palletizing devices in distribution centers.

BACKGROUND

The, optionally automatic, stacking of a base or carrier, in particular a pallet or a trolley, with packed items to form a stack for subsequent dispatch, i.e., "palletizing" is known per se. However, in this case, packed items having a uniform size or dimension are placed manually or by robots, grabs, etc., in locations determined by computer.

In contrast, the process of loading a load carrier with packed items with different characteristics to form a stack is the so-called "mixed-case" palletizing.

Current distribution logistics place ever increasing demands upon the picking process. Therefore, it is necessary to develop picking systems which process orders automatically without manual intervention.

To this end, automatic systems are being used ever more frequently for palletizing purposes. Such systems are known, e.g., from EP 1 462 394 B1, WO 2010/059923 A1 and WO 2008/068264 A1 or even WO 2014/005895 A1.

Thousands of different products (or packed items) with the most varied characteristics (size, shape, weight, dimensions, surfaces, solidity, etc.,) must be picked automatically with such systems.

Automated warehouses or goods distribution centers hold available a multiplicity of the most varied goods which, after an order has been placed, are compiled, i.e., picked, to produce a customised client delivery according to requirements.

In the goods distribution center, pallets holding one type of goods are generally delivered and temporarily stored. The pallets holding one type of goods generally comprise a plurality of packages which are palletized, e.g., in layers. For the purpose of temporary storage, so-called high-rack storage areas are often used which are designed as multi-level structures. The high-rack storage areas often use racking serving apparatuses in order in each case to remove a complete pallet from the high-rack storage area and to supply it to a singulating station. Other corresponding options for pallet storage are likewise feasible.

In this case, it is necessary to take account of different aspects which enormously increase the complexity compared with the "simple" manual stacking of simple regular geometries. For instance, a subsequent packed item can be stacked or placed effectively onto preceding packed item only if the latter has a flat or planar surface which should also be oriented approximately horizontally, and if the packed item can support the weight of the further packed items placed on it without incurring damage.

Furthermore, the formed stack should have a certain stability, inter alia to ensure that it does not fall over when being transported. Film-wrapping does help but on its own cannot stabilise an incorrectly formed stack.

Moreover, customers are ever more frequently requiring stacks to be optimized by reason of a desired unloading sequence. To this end, it has been found that a so-called shop-layout of the warehouse is advantageous. Particularly, in the food sector, warehouses are organized in this manner because the product range therein is extremely high and the unloading sequence in the supermarket is specified. In the case of a shop-layout, the different products are arranged as in the shop, i.e., grouped according to product families and arranged in specific aisles corresponding to the sequence on the shop floor. In other words, the different goods are thus arranged in the warehouse grouped in the aisles in the same sequence as in the supermarket aisles. In the warehouse, different goods are arranged or stored or organized into common groups of goods in spatial proximity, typically in the same or adjoining aisles.

In addition, the problem in the case of a shop layout of the warehouse in the distribution center is the change of flow and the distribution of the goods associated therewith. The goods are no longer distributed homogeneously across the warehouse or randomly but rather are organized in specific item groups in aisles, wherein the arrangement in the aisles is itself random.

The palletizing algorithms and machines used for forming stacks permit already relatively stable stacks having a specified order to be formed and have very high outputs or throughputs.

However, they may require a continuous flow of products from the corresponding aisles, for which reason they need replenishment or have to be filled.

It is also necessary to take into account a distribution of an order onto a plurality of pallets, as is generally the case when supplying goods to supermarkets.

Typically, the palletizing devices comprising goods are supplied to a warehouse as follows:

Initially, pallets holding one type of goods are delivered to the incoming goods area and temporarily stored. The pallets holding one type of goods generally comprise a plurality of packages which are palletized, e.g., in layers. For the purpose of temporary storage, the pallets are transported to high-rack storage areas where racking serving apparatuses are used for placing the pallets into storage or removing them from storage.

If goods are required from the corresponding pallet, the pallet is removed from storage and is depalletized mostly layer-by-layer in a depalletizer and subsequently the goods are singulated.

Then, the goods are temporarily stored in a buffer storage area until a corresponding order is actually waiting to be processed or all of the goods are in stock. The buffer storage areas are typically automatic small parts warehouses or shuttle warehouses in which the goods can be removed from storage individually and in a controlled manner according to a specified sequence (influenced, e.g., by the loading sequence on the pallet).

If an order has been placed, a stacking arrangement of the pallet or of the trolley is calculated on the basis of the ordered goods and the desired sequence of unloading, for which reason a palletizing algorithm of the warehouse management system establishes in advance a sequence and arrangement of the individual goods in the stack.

Subsequently, the different articles/goods are retrieved from the buffer storage area and are supplied in the calculated sequence to a palletizing machine or a manual palletizing device.

The goods which are now no longer present in the buffer storage area are then replenished from the pallet warehouse.

To this end, the goods are classified according to turnover rate and optionally further criteria (e.g., volume) and the number of parts to be depalletized (whole pallet, half a pallet, one layer, etc.,) is determined. This method together with the other warehouse strategies (cf. above), in particular the shop layout, ensures that the goods structure fluctuates from aisle to aisle in the buffer storage area (many slow-rotating items vs. few fast-rotating items or small goods vs. large goods). Therefore, capacity is lost in the storage aisles of the buffer storage area and goods which are required cannot be accommodated.

The turnover rate (fast-moving items vs. slow-moving items) of the goods can be established, e.g., by means of ABC analysis.

To date, replenishment has been performed merely statistically based on history; it is thus imprecise and possibly incorrect. Anticipatory forecasting to enable the supply of sufficient quantities is possible, e.g., only for about 3 to 4 hours. Therefore, bottlenecks can occur and so the palletizing machines are not able to call on their full capacity. To date, this supply aspect has not been addressed satisfactorily.

Therefore, one object of the present disclosure is to provide a supply method for palletizing machines in distribution centers, by means of which the supply to palletizing machines can be improved, even if the distribution center utilizes a shop layout.

SUMMARY

In accordance with one aspect of the present disclosure, it may be recognized that the buffer storage area is supplied with new goods from the pallets in the temporary storage area by removal from storage, depalletizing and singulation by means of a dynamic adaptation of the quantity to be removed from storage and depalletized, it is possible to hold available sufficient goods in the buffer storage area to process orders on the palletizing machine without any delays.

In other words, only shortly before a depalletizing procedure, which is planned statistically by means of historical data and typical turnover rate of goods, is a check carried out to establish whether the hitherto scheduled quantity of goods intended for depalletizing is sufficient for the respective aisle or article group in the aisle. Therefore, there is a wait until the last possible point in time in order to establish or vary the precisely required depalletizing quantity.

In the event of a low fill level, a decision can be made that the planned depalletizing quantity is increased, or in the case of a high fill level a decision can be made that the planned depalletizing quantity is reduced. It has thus been recognized that in this way it is possible to utilize the picking warehouse in a dynamically optimized manner.

In so doing, a distinction is made between the fill level and the filling extent. The filling extent relates to the free space in the buffer storage area, whereas the fill level relates to the quantity of specific articles in the buffer storage area.

Therefore, when replenishing the buffer storage area not only is the fill level of articles, which decreases on account of order processing, taken into consideration but also the filling extent of the buffer storage area. In the event of a high filling extent, fewer articles are depalletized and in the event of a lower filling extent, more articles are depalletized.

In an expedient manner, an arbitrary depalletizing quantity is not changed or determined but instead a minimum depalletizing quantity, which is specified for the goods warehouse and the specific product, is adapted dynamically at the time of depalletizing (i.e., not until just before the actual depalletizing, cf. above). This minimum depalletizing quantity is a depalletizing quantity which is calculated in advance statistically on the basis of the history of the order backlog and the goods warehouse and is at least depalletized in order to provide a supply to the buffer storage area.

For example, the depalletizing quantity can be adapted dynamically on the basis of the fill level of the respective product and/or the filling extent of the aisle(s) of the buffer storage area allocated to the depalletizer. In this case, the turnover rate can also be taken into account. Other significant goods characteristics, such as volume, weight, density, etc., can also be incorporated into the determination of the dynamic adaptation.

For instance, the depalletizing quantity can then be reduced or increased dynamically on the basis of the fill level or the filling extent of the aisles of the buffer storage area allocated to the depalletizer with the respective product.

However, such an increase is not performed excessively but rather only within a specified framework, e.g., a maximum depalletizing quantity, which is specified in particular for the goods warehouse and the specific product, is not exceeded so that space is always available for other goods in the buffer storage area.

In particular, it has been found that it is expedient if densely filled aisles of the buffer storage area—i.e., those with a high filling extent—are supplied more frequently but with a smaller quantity of goods in each supply procedure, and similarly less densely filled aisles of the buffer storage area are supplied less frequently but with a larger quantity of goods in each supply procedure.

The supply requirement can be verified cyclically, in dependence upon the fill level and/or the filling extent of the buffer storage area or in an event-controlled manner.

In a particularly preferred variant, the buffer storage area uses level racking serving apparatuses of the shuttle type which exchange goods between the aisles via dedicated cross-conveyance locations by placing said goods more deeply into storage, for example as described in DE 10 2012 107 176 A1 by Dematic Systems GmbH. Therefore, materials handling equipment can be omitted to the greatest possible extent in the pre-zone.

Preferably, only a small number, for example, two or three mutually adjoining aisles of the buffer storage area can be connected to a palletizing machine. It also may be preferable if two or three aisles of the buffer storage area are connected to a depalletizer. This has been found to be an effective configuration for a shop layout.

By restricting the family of articles to a small number of aisles within the framework of the shop layout, the necessary transfers between the aisles are minimized. The transfers could be performed in the pre-zone by means of materials handling equipment, as is typically the case. The pre-zone can then be relieved. However, if the transfers are performed, as is preferably the case, by means of the dedicated cross-conveyance locations and the shuttle vehicles, this leads in turn to an improvement in the utilization of the shuttle vehicles inter alia for placement into storage and removal from storage and the pre-zone can be completely omitted (cf. above).

Of course, other shuttle types, such as multi-level racking serving apparatuses and warehouses comprising pre-zones for transfers can also be used for this purpose.

The palletizing device can be a manual palletizing device, such as a manual Dematic Ergopal Station, such as described inter alia in WO 2009/109218 A1. However, a palletizing machine is preferably used, i.e., an automatic palletizing device.

It is understood that even if the term 'pallet' or 'palletizing' has been used, the stacking of other bases or supports, such as, e.g., trolleys, etc., is also possible and is to be encompassed by the present disclosure.

BRIEF DESCRIPTION OF THE DRAWINGS

The accompanying drawings, which are included to provide a further understanding of the embodiments of the present disclosure, are incorporated in and constitute a part of this specification, illustrate embodiments of the invention, and together with the detailed description, serve to explain the principles of the embodiments discussed herein. No attempt is made to show structural details of this disclosure in more detail than may be necessary for a fundamental understanding of the exemplary embodiments discussed herein and the various ways in which they may be practiced.

DETAILED DESCRIPTION

Figure 1:
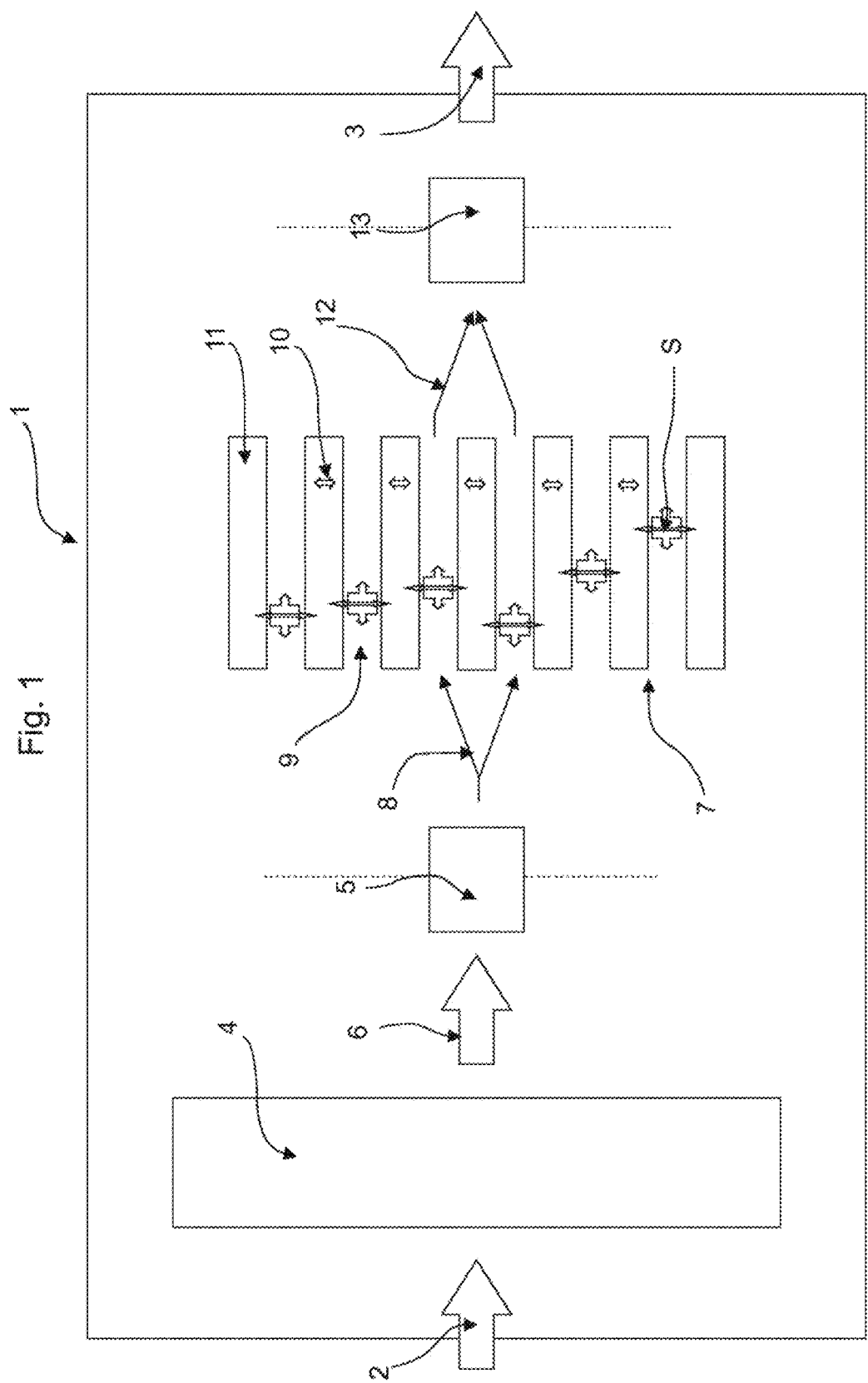
FIG. 1 shows a schematic block diagram of the structure of a distribution center.

FIG. 1 schematically shows a block diagram of the structure of a distribution center, which is designated in its entirety by the reference numeral 1, for supplying the flow of goods to supermarkets.

The distribution center 1 comprises an incoming goods area 2 where pallets holding one type of goods are delivered, and an outgoing goods area 3 where finished pallets and/or trolleys compiled according to customer requirements are loaded.

The delivered pallets are temporarily stored, for which reason they are transported to a high-rack storage area 4 where racking serving apparatuses are used for placing and removing the pallets into and out of storage.

The high-rack storage area 4 is connected to the depalletizer 5 via conveyors 6 so that when goods are required from a corresponding pallet, this pallet is removed from storage and depalletized usually layer-by-layer in a depalletizer 5 and then the goods are singulated.

The term 'goods' comprises inter alia individual articles, bundles and packaging units such as, e.g., 6-packs, shrink-wrapped articles, etc., and also goods picked according to customer requirements (e.g., for a chain store branch) in containers or cartons.

Then, the goods are temporarily stored in a buffer storage area 7 until a corresponding order is actually waiting to be processed or all goods are in stock. To this end, the depalletizers 5 are connected to the buffer storage area 7 via conveyors 8. In the present case, each depalletizer 5 is connected in each case to two aisles 9 of the buffer storage area 7.

The buffer storage area 7 is a shuttle warehouse in which the goods are stored according to a shop layout. The buffer storage area 7 utilizes level racking serving apparatuses S of the shuttle type which exchange goods between the aisles 9 via dedicated cross-conveyance locations 10 by placing said goods more deeply into storage on one racking side and removing them from storage in the normal manner on the other racking side of mutually adjoining racking units 11, for example as described in DE 10 2012 107 176 A1 by Dematic Systems GmbH. Therefore, the goods are exchanged between the aisles 9 of the buffer storage area 7 by means of the level racking serving apparatuses S and the cross-conveyance locations 10.

The buffer storage area 7 is connected to the palletizing machine 13 via conveyors 12 for the purpose of processing orders or stacking pallets or trolleys, as known from, for example, DE 10 2012 106 109 A1. For this purpose, two aisles 9 of the buffer storage area 7 are connected in each case to a palletizing machine 13.

The palletizing machines 13 dispose of completed pallets and trolleys via conveyors 14 to the outgoing goods area 3.

In order to ensure the processing of orders for compiling the pallets, it is necessary to ensure the supply of goods to the buffer storage area 7 (e.g., from the high-rack storage areas 4) and thus to the palletizing machines 13.

Figure 2:
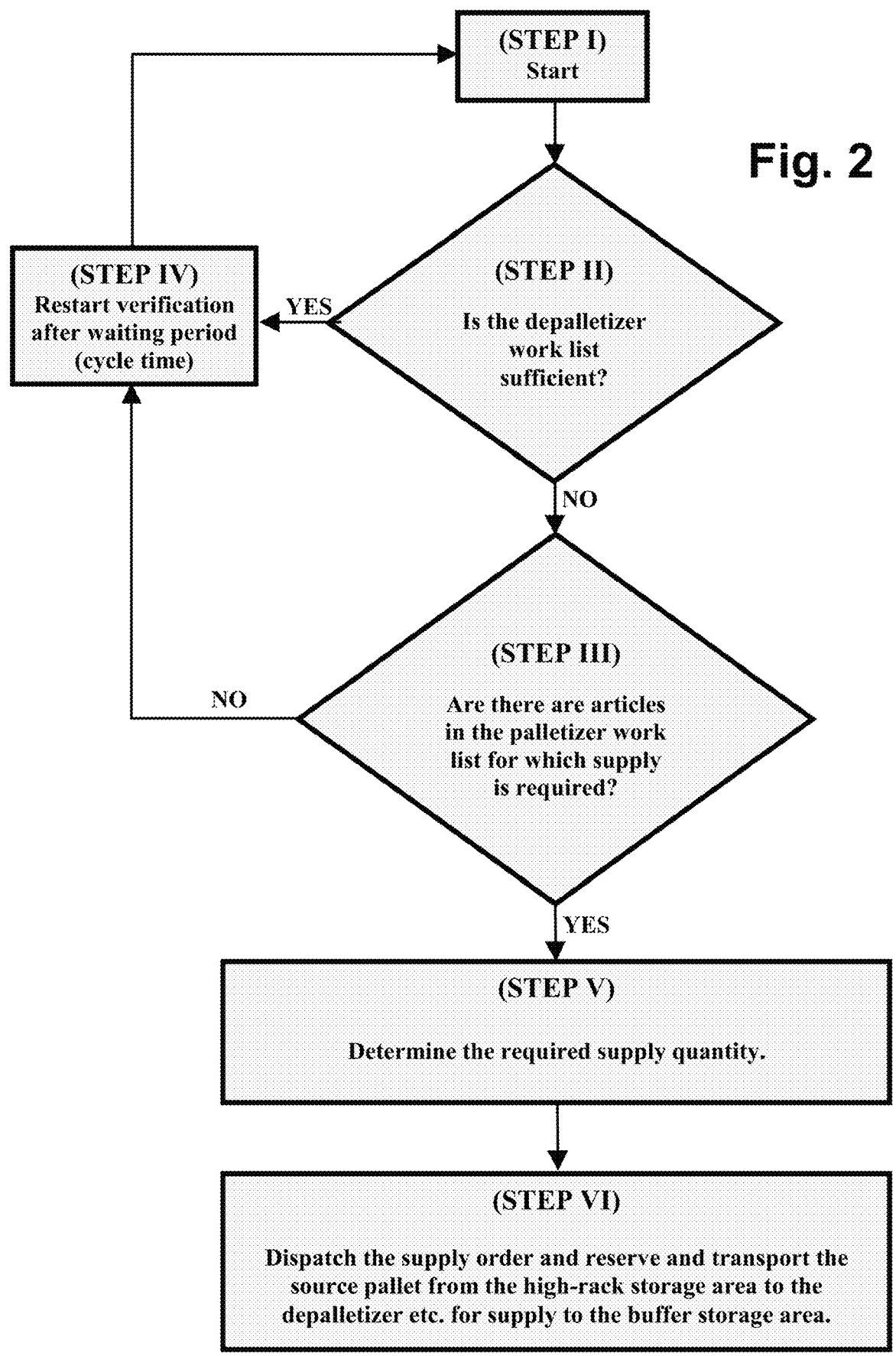
FIG. 2 shows a flow diagram of the supply to a palletizing machine of FIG. 1.

To this end, in accordance with the present disclosure, the following procedure is performed and is explained with further reference to the process flow illustrated in FIG. 2.

For each depalletizer 5 (FIG. 1), a depalletizer work list is configured (number of pallets/layers/packages to be depalletized) and accordingly for the control of supply a palletizer work list is configured (number of orders/order lines/cases to be processed, number of pallets/layers/packages to be palletized, expected total palletizing period).

From this palletizer work list it is possible to dynamically determine the current demand for each article. Furthermore, an optimum stock inventory is configured for each article. The optimum stock inventory can be calculated if statistics or prognoses of the sales quantities (demand in the orders of the distribution center) are available for the articles and a desired range is established for each article. Fast-moving items then have a higher optimum stock inventory and slow-moving items have a lower optimum stock inventory. Therefore, a specified minimum depalletizing quantity is available.

Articles are grouped into article families in the shop layout in the buffer storage area (i.e., different goods are arranged or stored in a manner organized into common groups of goods in spatial proximity, typically in the same or adjoining aisles), wherein a list of the assigned depalletizers 5 is established for each article family. Each depalletizer 5 is allocated to one or a plurality of article families.

For each individual depalletizer 5, a check is performed cyclically to establish whether a further supply order can or must be dispatched.

The sequence of the articles, the supply of which is to be checked, in the palletizer work list is defined by the priority of the orders.

The dispatch of supply orders can also be checked in an event-controlled manner (instead of cyclically), e.g., if the depalletizer work list decreases or the palletizer work list increases.

In addition, in order to check whether an article needs to be supplied, a minimum stock inventory per article can be configured and checked.

A desired filling extent is configured for the buffer storage area 7. In determining the supply quantity, the current average filling extent of the storage-entry aisles permitted for the associated article family is determined. If this filling extent is less than the desired value, the supply quantity is then increased. If the filling extent is higher, the supply quantity is reduced, wherein, however, the current demand must be fulfilled.

For instance, as illustrated in FIG. 2, after the start (step I) an initial check is performed to establish whether the depalletizer work list is sufficient (step II).

If this is affirmed, then the verification is restarted after a waiting period (cycle time, step IV).

If this is not affirmed, then a check is performed in the next step III to establish whether there are articles in the palletizer work list for which supply is required.

If this is not affirmed, then the verification is restarted after a waiting period (cycle time, step IV).

If this is affirmed (step V), the required supply quantity is then determined. To this end, the quantity is calculated from the difference between the optimal stock inventory and the actual stock inventory, wherein, if the demand is greater than the optimum stock inventory, the quantity is calculated as the difference between the actual demand and the stock inventory.

When refilling the buffer storage area, not only is the fill level with articles, which decreases by reason of order processing, taken into consideration but also the filling extent of the buffer storage area. In the case of a high filling extent, fewer articles are depalletized and in the event of a low filling extent, more articles are depalletized.

In an expedient manner, rounding-up takes place to maintain complete layers, half pallets or whole pallets which are to be supplied by the depalletizer 5.

In accordance with the present disclosure, the quantity calculated in this manner is subjected to dynamic adaptation of the supply quantity.

The dynamic supply quantity is determined by multiplying the quantity previously calculated from statistical data by a scaling factor. This factor is 1 if the current filling extent of the article in the buffer storage area corresponds to the desired value. If the filling extent is lower than the desired value, then the factor is greater than 1. If the filling extent is higher, then the factor is less than 1. If the current filling extent is about 100%, then the scaling factor should be about 0.

For instance, in the case of a linear approach the scaling factor can be calculated as (100%−current filling extent)/(100%−desired filling extent).

For a current filling extent of 60% and a desired value of 80%, the scaling factor is 2.0, i.e. the supply quantity is doubled. For a current filling extent of 90% and a desired value of 80%, the scaling factor is 0.5, i.e., the supply quantity is halved.

The dynamicized quantity calculated in this manner is rounded up once again to pallet units to be depalletized.

Then, it is possible (in step VI) to dispatch the supply order and reserve and transport the source pallet from the high-rack storage area to the depalletizer etc. for supply to the buffer storage area.

The foregoing description generally illustrates and describes various embodiments of the present disclosure. It will, however, be understood by those skilled in the art that various changes and modifications can be made to the above-discussed constructions and systems without departing from the spirit and scope of this disclosure as disclosed herein, and that it is intended that all matter contained in the above description or shown in the accompanying drawings shall be interpreted as being illustrative, and not to be taken in a limiting sense. Furthermore, the scope of the present disclosure shall be construed to cover various modifications, combinations, additions, alterations, etc., above and to the above-described embodiments, which shall be considered to be within the scope of this disclosure. Accordingly, various features and characteristics as discussed herein may be selectively interchanged and applied to other illustrated and non-illustrated embodiment, and numerous variations, modifications, and additions further can be made thereto without departing from the spirit and scope of the present invention as set forth in the appended claims.

What is claimed is:

1. A method of supplying a palletizing device with goods for order-related palletization in a warehouse or distribution center, the method comprising:

delivering pallets holding the goods to an incoming goods area of the warehouse;

transporting, by a racking serving mechanism, and temporarily storing the pallets in a temporary storage area;

removing, by the racking serving mechanism, one or more pallets containing goods from the temporary storage area for replenishing a buffer storage area;

depalletizing, by a depalletizing apparatus, the goods from the one or more pallets layer-by-layer and, upon the depalletizing, singulating the goods;

buffering, by a level racking serving apparatus, the singulated goods in the buffer storage area, wherein the buffer storage area is provided with a shop layout and has individual access, and wherein the buffer storage area is connected to a palletizing device for supplying the goods to the palletizing device in accordance with an order;

removing, by the level racking serving apparatus, the goods required for the order from the buffer storage area;

transporting, via a first conveyor system, the goods required for the order to the palletizing device individually and in a controlled manner according to a specified sequence for palletizing; and supplying, via a second conveyor system, the buffer storage area with new goods from the pallets in the temporary storage area by (i) removing, by the racking serving mechanism, pallets with the new goods from the temporary storage area, and (ii) depalletizing and singulating, by the depalletizing apparatus, the new goods using a dynamic adaptation of a minimum depalletizing quantity;

wherein the dynamic adaptation is used to specify the minimum depalletizing quantity of the new goods and a specific product to be at least depalletized, wherein the minimum depalletizing quantity is statistically calculated in advance of the depallatizing based on history of at least an order backlog, wherein the minimum depalletizing quantity is dynamically adapted during the depalletizing and is based on (1) a fill level of the specific product and (2) a filling extent of one or more aisles of the buffer storage area allocated to the depalletizer, wherein the minimum depalletizing quantity is dynamically reduced or increased based on (1) the fill level of the specific product and (2) the filling extent of the one or more aisles of the buffer storage area allocated to the depalletizer, and wherein one or more densely filled aisles of the buffer storage area are supplied more frequently but with a smaller quantity of the new goods.

2. The method of claim 1, wherein a maximum depalletizing quantity is not exceeded.

3. The method of claim 1, wherein less densely filled aisles of the buffer storage area are supplied less frequently but with a larger quantity of goods.

4. The method of claim 1, wherein the buffer storage area utilizes level racking serving apparatuses of the shuttle type which exchange goods between the aisles via dedicated cross-conveyance locations by placing the goods more deeply into the temporary storage area.

5. The method of claim 1, wherein at least two aisles of the buffer storage area are connected to the palletizing device.

6. The method of claim 1, wherein at least two aisles of the buffer storage area are connected to the depalletizing apparatus.

7. The method of claim 1, wherein the palletizing device is a palletizing machine.

8. A method of supplying goods for orders at a warehouse or distribution center, the method comprising:
- receiving, via a racking serving mechanism, a plurality of pallets at a temporary storage area, each pallet of the plurality of pallets at least partially supporting a specific type or set of goods;
- dynamically selecting, via the racking serving mechanism, pallets of the plurality of pallets received in the temporary storage area for depalletization based at least in part on the specific type or set of goods on the selected pallets;
- transferring, via a first conveyor system, the selected pallets from the temporary storage area to a depalletizing apparatus of a plurality of depalletizing apparatuses, wherein the depalletizing apparatus is allocated to a family of goods associated with the specific type or set of goods on the selected pallets;
- depalletizing, by the depalletizing apparatus, the specific type or set of goods from the selected pallets;
- transferring, via a second conveyor system, the specific type or set of goods to a buffer storage area and storing the specific goods in a portion of the buffer storage area substantially in spatial proximity to other goods of the family of goods;
- removing, by a level racking serving apparatus, and transporting, via a third conveyor system, one or more of the specific type or set of goods required for an order from the buffer storage area to a palletizing device for palletizing;
- palletizing, by the palletizing device, the one or more of the specific type or set of goods required for the order;
- providing, via a fourth conveyor system, the palletized goods to an outgoing goods area for shipment of the order; and
- supplying, via the second conveyor system, the buffer storage area with new goods from the pallets in the temporary storage area by (i) dynamically selecting pallets of the plurality of pallets for depalletization based at least in part on the specific type or set of goods on the selected pallets, (ii) removing the selected pallets from the temporary storage area, and (iii) depalletizing, using a dynamic adaptation of a minimum depalletizing quantity, the specific type or set of goods on the selected pallets;
- wherein the minimum depalletizing quantity is statistically calculated in advance of the depallatizing based at least on history of an order backlog, wherein the minimum depalletizing quantity is dynamically adapted during the depalletizing and is based on (1) a fill level of the specific type or set of goods and (2) a filling extent of one or more aisles of the buffer storage area allocated to the depalletizing apparatus.

9. The method of claim 8, wherein the palletizing device is an automatic palletizing device.

10. The method of claim 8, wherein the temporary storage area comprises a high-rack storage area including one or more racking serving mechanisms that place and remove the plurality of pallets into and out of the temporary storage area.

11. The method of claim 10, wherein the high-rack storage area is connected to the plurality of depalletizing apparatuses by a plurality of first conveyor systems.

12. The method of claim 8, wherein the buffer storage area comprises a plurality of aisles and one or more shuttles movable thereabout that are operable to exchange stored goods between aisles of the plurality of aisles.

13. The method of claim 12, wherein the buffer storage area is in communication with the palletizing device by a plurality of third conveyor systems.

14. A method of supplying a palletizing device with goods for order-related palletization in a warehouse or distribution center, the method comprising:
- delivering pallets holding the goods to an incoming goods area of the warehouse;
- using a racking serving mechanism to transport the pallets into a temporary storage area and to selectively remove one or more pallets from the temporary storage area for replenishing a buffer storage area;
- using a depalletizing apparatus to depalletize the goods layer-by-layer from the one or more pallets and to singulate the goods;
- using a level racking serving apparatus to buffer the singulated goods in the buffer storage area and to remove one or more goods from the buffer storage area in accordance with an order;
- transporting, via a conveyor system, the one or more goods required for the order to a palletizing device according to a specified sequence for palletizing; and
- supplying the buffer storage area with new goods from the pallets in the temporary storage area by (i) removing at least one pallet with the new goods from the temporary storage area, and (ii) depalletizing and singulating the new goods using a dynamic adaptation of a minimum depalletizing quantity;
- wherein the dynamic adaption is used to specify the minimum depalletizing quantity of the new goods and a specific product to be at least depalletized, wherein the minimum depalletizing quantity is statistically calculated in advance of the depallatizing based on history of at least an order backlog, wherein the minimum depalletizing quantity is dynamically adapted during the depalletizing and is based on (1) a fill level of the specific product and (2) a filling extent of one or more aisles of the buffer storage area allocated to the depalletizing apparatus, wherein the minimum depalletizing quantity is dynamically reduced or increased based on (1) the fill level of the specific product and (2) the filling extent of the one or more aisles of the buffer storage area allocated to the depalletizing apparatus, and wherein one or more densely filled aisles of the buffer storage area are supplied more frequently but with a smaller quantity of the new goods.

15. The method of claim 14, wherein the depalletizing apparatus comprises a plurality of depalletizing apparatuses, and wherein each depalletizing apparatus is allocated to one or more groups of goods.

16. The method of claim 15, wherein the singulated goods are grouped into common groups of goods in the buffer storage area.

17. The method of claim 14, wherein the temporary storage area is connected to the depalletizing apparatus via a first set of conveyors.

18. The method of claim 14, wherein the depalletizing apparatus is connected to the buffer storage area via a second set of conveyors.

19. The method of claim 14, wherein the palletizing device is configured to process the order and to dispose of the order to an outgoing goods area.

20. The method of claim 19, wherein the palletizing device is connected to the outgoing goods area via a third set of conveyors.

* * * * *